(12) United States Patent
Kribernegg

(10) Patent No.: US 11,686,686 B2
(45) Date of Patent: Jun. 27, 2023

(54) METHOD FOR TESTING A PRESERVATIVE LAYER

(71) Applicant: MAGNA STEYR Fahrzeugtechnik AG & Co KG, Graz (AT)

(72) Inventor: Christoph Kribernegg, Leibnitz (AT)

(73) Assignee: MAGNA STEYR Fahrzeugtechnik GMBH & Co KG, Graz (AT)

( * ) Notice: Subject to any disclaimer, the term of this patent is extended or adjusted under 35 U.S.C. 154(b) by 0 days.

(21) Appl. No.: 17/404,750

(22) Filed: Aug. 17, 2021

(65) Prior Publication Data

US 2022/0057334 A1 Feb. 24, 2022

(51) Int. Cl.
*G01N 21/64* (2006.01)
*G01N 21/88* (2006.01)

(52) U.S. Cl.
CPC ..... *G01N 21/8806* (2013.01); *G01N 21/6456* (2013.01); *G01N 2021/646* (2013.01)

(58) Field of Classification Search
CPC ........... G01N 21/8806; G01N 21/6456; G01N 2021/646; G01N 21/9515; G01N 21/954; G01N 21/8422; G01N 2021/9518; G01N 21/88
See application file for complete search history.

(56) References Cited

U.S. PATENT DOCUMENTS

| | | | |
|---|---|---|---|
| 3,675,015 A | 7/1972 | Geib | |
| 3,930,063 A | 12/1975 | Miller et al. | |
| 4,250,382 A | 2/1981 | Libby | |
| 5,625,197 A * | 4/1997 | Shimbara | G06T 7/0004 250/559.22 |
| 5,717,217 A | 2/1998 | Neckers et al. | |
| 6,410,926 B1 | 6/2002 | Munro et al. | |
| 6,992,781 B2 | 1/2006 | Okada et al. | |
| 2006/0274171 A1 * | 12/2006 | Wang | G06K 7/0004 348/E5.042 |

(Continued)

FOREIGN PATENT DOCUMENTS

| | | |
|---|---|---|
| DE | 3853207 T2 | 9/1995 |
| DE | 20301286 U1 | 7/2003 |
| DE | 60024314 T2 | 7/2006 |

(Continued)

OTHER PUBLICATIONS

Translation of DE-102013223261 (Year: 2015).*

*Primary Examiner* — David P Porta
*Assistant Examiner* — Mamadou Faye
(74) *Attorney, Agent, or Firm* — Jordan IP Law, LLC; Todd A. Vaughn

(57) ABSTRACT

A method for inspecting a preservation layer of a motor vehicle component during the manufacture of a motor vehicles. A preservation medium is applied having fluorescent additives to a component of the motor vehicle in a coating region. An inspection head having at least one camera and a UV light source is then caused to move adjacent to an inspection region that is a partial region of the coating region. The UV light source is the caused to emit radiating light onto the inspection region and the at least one camera is concurrently caused to record at least one image of the inspection region. An examination of the at least one recorded image is then conducted for a faulty coating with the preservation medium.

18 Claims, 2 Drawing Sheets

(56) References Cited

U.S. PATENT DOCUMENTS

2006/0289766 A1\* 12/2006 DiMarzio .............. G01N 21/88
250/341.8

FOREIGN PATENT DOCUMENTS

| DE | 102013223261 A1 \* | 5/2015 | ............. B05D 5/005 |
| DE | 102013223261 A1 | 5/2015 | |
| DE | 102008003940 B3 | 2/2019 | |
| EP | 1585979 B1 | 12/2010 | |
| JP | 2000094402 A | 4/2000 | |
| WO | 9532060 A1 | 11/1995 | |

\* cited by examiner

METHOD FOR TESTING A PRESERVATIVE LAYER

CROSS-REFERENCE TO RELATED APPLICATIONS

The present application claims priority under 35 U.S.C. § 119 to German Patent Publication No. DE 102020210484.0 (filed on Aug. 18, 2020), which is hereby incorporated by reference in its complete entirety.

TECHNICAL FIELD

One or more embodiments relate to a method for inspecting a preservation layer of a component, in particular, in the manufacture of motor vehicles.

BACKGROUND

In the course of the manufacture of motor vehicles, bodywork components are usually painted, typically via cathodic dip coating. A preservation process follows the painting, in which a preservation medium, for example, a wax, is applied to the component using tools such as, for example, nozzles, usually being sprayed.

To avoid unwanted corrosion, the quality of the preservation layer is of great significance, for example in automobile construction. Preservation layers are therefore inspected regularly in the course of the operation of a manufacturing plant, sometimes even a plurality of times each day. For inspecting the preservation layers, sending what are known as "inspection bodies" through the plant is known. These inspection bodies pass through the preservation process like the other vehicle parts that are to be manufactured. The preservation, opening, inspecting, and documenting of such inspection bodies is a time-consuming process.

SUMMARY

One or more embodiments provide a method for inspecting a preservation layer of a component that can be conducted in a short time and at low cost.

In accordance with one or more embodiments, a method for inspecting a preservation layer of a component, in particular, in the manufacture of motor vehicles, includes applying a preservation medium having fluorescent additives to the component in a coating region; moving or manipulating, by a control unit (e.g., one or more computing devices having one or more processors), an inspection head comprising at least one camera and a UV light source adjacent to an inspection region that is a partial region of the coating region; applying, via the UV light source, radiated light adjacent to the inspection region and onto the inspection region; recording, via the camera, at least one image of the inspection region; and evaluating, by an evaluation unit (e.g., one or more computing devices having one or more processors), the recorded image for faulty coating with the preservation medium.

In accordance with one or more embodiments, a preservation medium such as a wax to which fluorescent additives have been added is used. In this way, the coverage of the component with the preservation medium can subsequently be made easily visible via a UV light source. An inspection head is fitted with the UV light source and with a camera. The inspection head is flexibly moveable to desired inspection regions of the component. In this way, predetermined regions can be specifically and precisely inspected. For instance, zones of the component that are particularly at risk (e.g., such as flange regions, overlapping regions, etc.), regions in the component that are difficult to see (e.g., cavities), or angles and edges of the component that are difficult to see, etc. The inspection head is therefore fixedly attached to a robotic arm for movement.

In accordance with one or more embodiments, a preservation of a cavity can be inspected, as well as a surface preservation. The camera at the inspection head can prepare a recording of a desired inspection region. This recording can, for example, be searched for faults by an evaluation unit using image analysis methods.

In accordance with one or more embodiments, as a result of this technical solution, it is not necessary to send inspection bodies into a plant, similarly to random samples, in order to appraise the quality of the preservation. The very components that are to be preserved are inspected. The inspection head can be selectively moved specifically to desired regions of the component in order to examine them.

In accordance with one or more embodiments, the movement of the inspection head "into the vicinity of the inspection region" indicates that the camera is not only able simply to record an image of an entire component, but can be selectively moved deliberately to specific regions of the component. Consequently, the inspection region recorded by the camera usually only represents a segment of the component. It is therefore preferred for the distance of the camera from the component during the recording of an image to be less than an extent of the component in a direction perpendicular to the axis of the recording, preferably less than half the extent of the component.

In accordance with one or more embodiments, the specification that "the inspection region is a partial region of the coating region" also includes the possibility that the inspection region does comprise the entire coating region. The entire coated region of a component can therefore also be inspected.

In accordance with one or more embodiments, the recorded image is examined by the evaluation unit for faulty coating with the preservation medium in that the recorded image is compared with a stored image of a fault-free coating. A comparison recording, for example, of another component of the same component type, is preferably thus recorded. This comparison recording is stored before inspecting the component. The quality of the preservations of the components to be inspected can be determined through a comparison with this previously stored recording for this position or location.

In accordance with one or more embodiments, the recorded image is divided by the evaluation unit into sectors, and the individual sectors are examined for faulty coating with the preservation medium. The sectors, that is the image segments, can cover the entire inspection region, or a portion thereof, in particular, a sequence, of the inspection region. The sectors preferably do not overlap.

In accordance with one or more embodiments, the evaluation unit can be realized or arranged in the camera and/or in the inspection head and/or in a higher-level production, inspection or manufacturing plant.

In accordance with one or more embodiments, the individual sectors of the recorded image are compared with respective corresponding sectors of the stored image in order to examine the recorded image for faulty coating with the preservation medium.

In accordance with one or more embodiments, to examine whether coating with the preservation medium is faulty, the evaluation unit can assess the presence of a coating and/or the width of the coating and/or the continuity of the coating on the recorded image, for each sector of the image, for example. Should a fault be ascertained or identified in a single sector, the inspection region, and thus, the component, can be classified as faulty and not okay.

In accordance with one or more embodiments, the inspection head is mounted on a robot, and, for selectively moving the inspection head into the vicinity of the inspection region, the control unit comprises a control unit of the robot and/or a control unit of a higher-level production, inspection, or manufacturing installation.

In accordance with one or more embodiments, the camera records a plurality images of the inspection region, while the camera is caused to be shifted and/or rotated by the control unit of the robot and/or of the production, inspection, or manufacturing installation between each of the individual recordings of the inspection region. The camera can to a certain extent "sample" the inspection region by making a plurality of recordings from different recording positions and/or recording angles. Each individual image can be compared in each case with a corresponding image previously recorded at this position or previously stored for this position or this inspection region.

In accordance with one or more embodiments, the camera here is moved by the robot or by a comparable positioning system, both for the preparation of comparison recordings of a fault-free coating, for example, of another component of the same component type, as well as for recordings of the components that are concretely to be inspected at the individual positions of the inspection region required for the respective inspection task. In this way, larger inspection regions can also be inspected and/or assessed, one position after another, by comparing the respective recordings on the one hand automatically and on the other hand very precisely. A plurality of images are, as it were, continuously and/or sequentially prepared along the component surface at previously precisely defined or determined positions, are compared and, depending thereon, an assessment of the component is made or, if faults in one or a plurality of sectors of individual images of the component surface are correspondingly ascertained or identified, a warning is output and/or the component assessed as having lower quality.

In accordance with one or more embodiments, the inspection region can be situated in a cavity of the component accessible through an opening, and the inspection head can be selectively moved by the control unit through the opening into the cavity in order to move the inspection head into the vicinity of the inspection region. The opening can, in particular, be a hole or a bore in the component.

In accordance with one or more embodiments, the inspection head comprises a tubular carrier to the front end of which the camera and the UV light source are fastened. The tubular carrier of the inspection head can then be moved through the opening of the component. The tubular carrier can, for example, have a round or angular cross-section.

DRAWINGS

One or more embodiments will be illustrated by way of example in the drawings and explained in the description below.

DESCRIPTION

Figure 1:
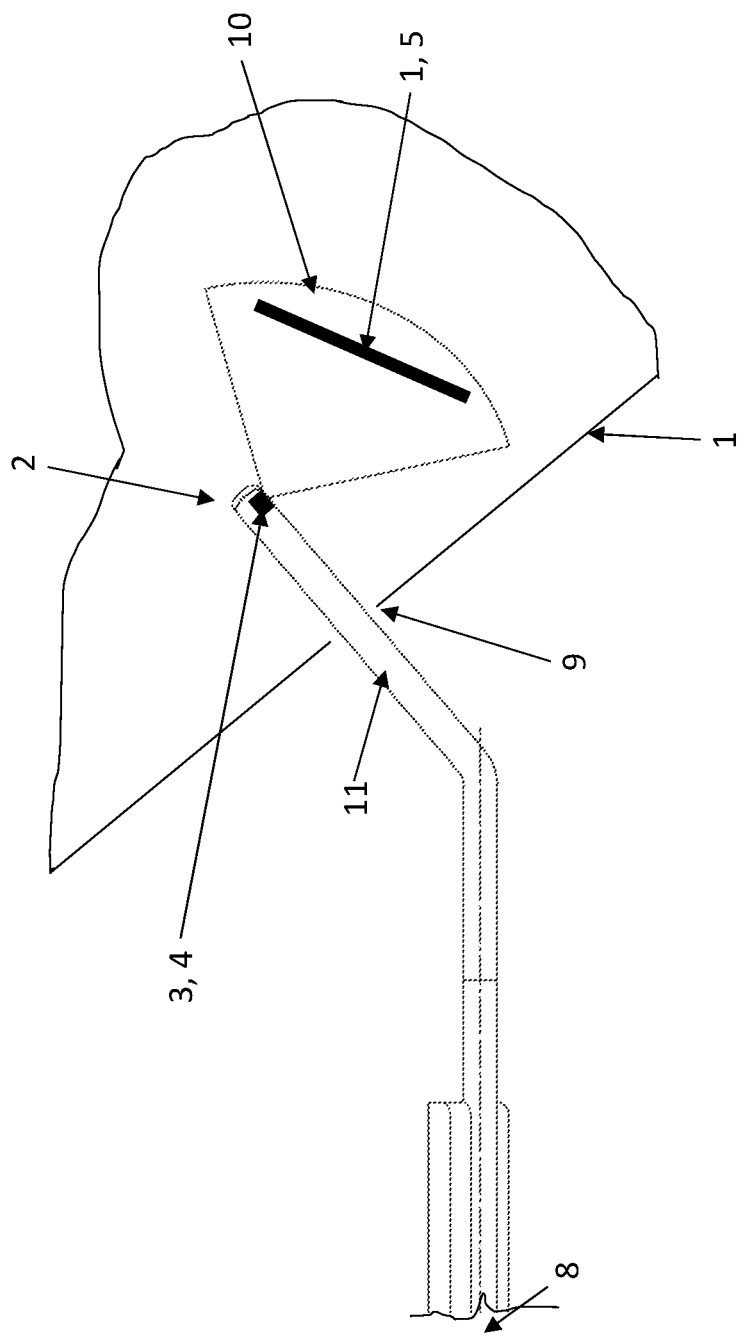
FIG. 1 illustrates a schematic view of a step in a method in accordance with one or more embodiments.

An apparatus is illustrated in FIG. 1 that carries out a method in accordance with one or more embodiments for the inspection of a preservation layer of a component 1, in particular, of a body component during the manufacture of a motor vehicle. A preservation medium that includes fluorescent additive materials was previously applied to the component 1 in a coating region. For inspection, an inspection head 2 that comprises at least a miniaturized camera 3 and a UV light source 4 such as, for example, a UV light diode at one end of the inspection head 2, is selectively moved by a control unit into the vicinity of an inspection region 5 at the component 1. The inspection region 5 is a partial region of the coating region, and thus, is at least partially coated.

The inspection head 2 comprises a tubular carrier 11 at the end of which the camera 3 and the UV light source 4 are mounted. The inspection head 2, in particular, the tubular carrier 11, is mounted on a robot 8. The robot 8, in particular, a control unit of the robot 8, can cause movement of the inspection head 2 into the vicinity of the inspection region 5. The inspection region 5 is located in a cavity of the component 1 that is accessible through an opening 9. The inspection head 2 is moved by the control unit of the robot 8 through the opening 9 into the cavity in order to move the inspection head 2 into the vicinity of the inspection region 5.

The UV light source 4 radiates light onto the inspection region 5, and the camera 3 records at least one image 6 of the inspection region 5. The camera 3 has an aperture angle of the camera lens 10 that is illustrated in FIG. 1. The UV light source 4 is structurally dimensioned and arranged in such a way that it also illuminates essentially the aperture angle of the camera lens 10. The camera 3 can record a plurality of images 6 of the inspection region 5, while the camera 3 is shifted and/or rotated by the control unit of the robot 8 between each of the individual recordings of the inspection region 5.

Figure 2:
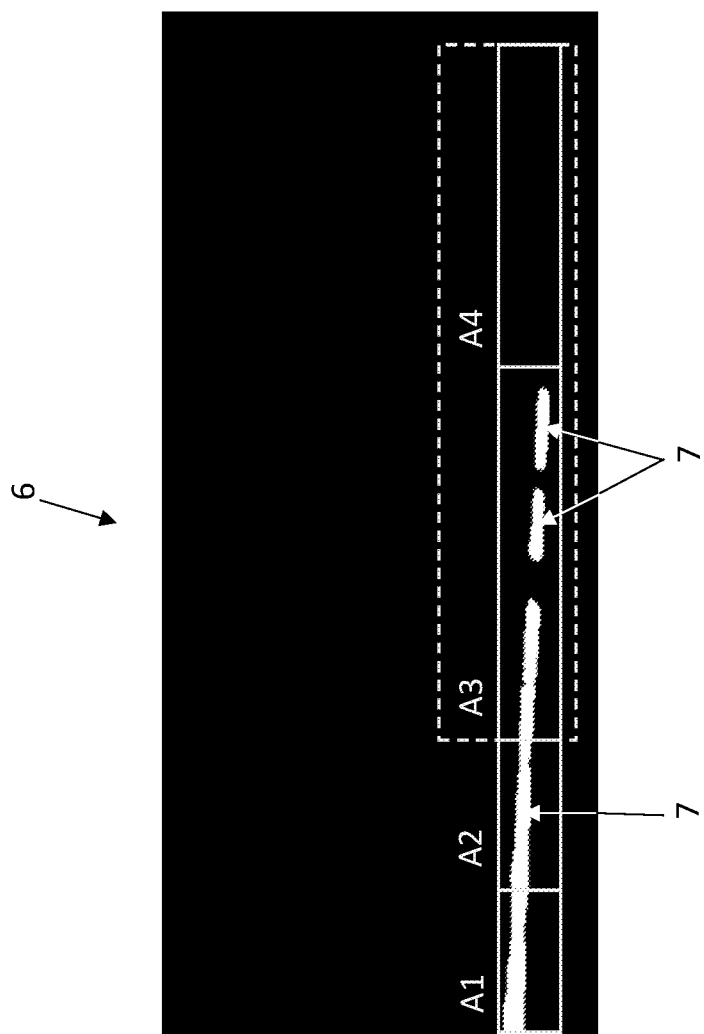
FIG. 2 illustrates a schematic view of a recording recorded with a camera in a method in accordance with one or more embodiments.

An image 6 recorded by the camera 3 is illustrated in FIG. 2. The fluorescent coating 7 can be recognized here as bright spots on the image 6. The image 2 is examined by an evaluation unit for faulty coating 7 with the preservation medium. The recorded image 6 is divided for this purpose by the evaluation unit into a plurality of individual sectors A1, A2, A3, A4, and the individual sectors A1, A2, A3, A4 are examined for faulty coating 7 with the preservation medium. The individual sectors A1, A2, A3, A4 of the recorded image 6 can, for example, be compared with respective corresponding sectors A1, A2, A3, A4 of a stored image, in order to examine the recorded image 6 for faulty coating 7 with the preservation medium. The evaluation unit can assess the presence of a coating 7 and/or the width of the coating 7 and/or the continuity of the coating 7 in the individual sectors of the recorded image 6.

In the image illustrated in FIG. 2, sectors A1 and A2 have continuous coatings with a desired coating width, and thus, are fault-free. The coating 7 of sector A3, however, is interrupted. The sector A4 incorrectly has no coating 7 at all. For that reason, the sectors A3 and A4 (surrounded with dotted lines in FIG. 2), are identified as faulty. The corresponding component is therefore not properly coated, and can, for example, be rejected or coated again.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Component
2 Inspection head
3 Camera
4 UV light source
5 Inspection region
6 Image
7 Coating
8 Robot
9 Opening
10 Aperture angle of the camera lens
11 Tubular carrier
A1 Sector
A2 Sector
A3 Sector
A4 Sector

What is claimed is:

1. A method for inspecting a preservation layer of a component in a manufacture of motor vehicles in which a preservation medium having fluorescent additives is sprayed to the component in a coating region, the method comprising:
   by a computing device having one or more processors:
      selectively moving an inspection head having at least one camera and a UV light source by a control unit adjacent to an inspection region of the component that is a partial region of the coating region having the preservation medium, the inspection region being located in a cavity of the component accessible through an opening;
      causing the UV light source to emit radiating light onto the inspection region and concurrently causing the at least one camera to record at least one image of the inspection region; and
      appraising the quality of the preservation layer by examining the at least one recorded image for faulty coating of the preservation medium,
      wherein the inspection head is selectively moved adjacent to the inspection region through the opening into the cavity.

2. The method of claim 1, wherein the examining comprises comparing the at least one recorded image with a stored image of another component of a same component-type having a fault-free coating.

3. The method of claim 2, wherein the examining comprises:
   dividing, via the computing device, the at least one recorded image into a plurality of individual sectors, and
   examining the individual sectors for a faulty coating with the preservation medium.

4. The method of claim 3, wherein the individual sectors are compared with respective corresponding sectors of the stored image.

5. The method of claim 1, wherein the examining comprises assessing, via the computing device, a presence of the coating, and/or a width of the coating, and/or a continuity of the coating in the at least one recorded image.

6. The method of claim 1, wherein the inspection head is mounted on a robot comprising the computing device.

7. The method of claim 1, wherein the inspection head is mounted on a robot controlled by the computing device.

8. The method of claim 1, wherein concurrently recording the at least one image of the inspection region comprises concurrently recording a plurality of images of the inspection region concurrently while the camera is shifted and/or rotated by the computing device, between each of the recordings of the inspection region.

9. A method, comprising:
   spraying, during manufacture of a motor vehicle, a preservation layer that includes a preservation medium having fluorescent additives to a component of the motor vehicle in a coating region;
   selectively moving, via a computing device having one or more processors, an inspection head having at least one camera and a UV light source adjacent to an inspection region of the component that is a partial region of the coating region having the preservation medium, the inspection region being located in a cavity of the component accessible through an opening;
   causing, via the computing device, the UV light source to emit radiating light onto the inspection region and concurrently causing the at least one camera to record at least one image of a surface of the component in the inspection region;
   appraising the quality of the preservation layer by examining, via the computing device, the at least one recorded image for a faulty coating of the preservation medium; and
   sending, after the appraisal, a warning when faults in one or more sectors of the at least one recorded image of the surface of the component is identified,
   wherein the inspection head is selectively moved adjacent to the inspection region through the opening into the cavity.

10. The method of claim 9, wherein the examining comprises comparing the at least one recorded image with a stored image of another component of a same component-type having a fault-free coating.

11. The method of claim 10, wherein the examining comprises:
   dividing, via the computing device, the at least one recorded image into a plurality of individual sectors, and
   examining the individual sectors for a faulty coating with the preservation medium.

12. The method of claim 11, wherein the individual sectors are compared with respective corresponding sectors of the stored image.

13. The method of claim 9, wherein the examining comprises assessing, via the computing device, a presence of the coating, and/or a width of the coating, and/or a continuity of the coating in the at least one recorded image.

14. The method of claim 9, wherein concurrently recording the at least one image of the inspection region comprises concurrently recording a plurality of images of the inspection region concurrently while the camera is shifted and/or rotated by the computing device between each of the recordings of the inspection region.

15. A method for inspecting a preservation layer of a motor vehicle component during a manufacture of the motor vehicle, the method comprising:
by a computing device having one or more processors:
selectively moving an apparatus having at least one camera and a UV light source adjacent to an inspection region of a motor vehicle component having sprayed on a coating region thereof a preservation medium having fluorescent additives, wherein the inspection region is a partial region of the coating region having the preservation medium and is located in a cavity of the motor vehicle component accessible through an opening;
causing radiating light to be emitted onto the inspection region and concurrently causing a recording of at least one image of a surface of the component in the inspection region;
appraising the quality of the preservation layer by examining the at least one recorded image for a faulty coating of the preservation medium; and
sending, after the appraisal, a warning when faults in one or more sectors of the at least one recorded image of the surface of the component is identified,
wherein the inspection head is selectively moved adjacent to the inspection region through the opening into the cavity.

16. The method of claim 15, wherein the examining comprises comparing the at least one recorded image with a stored image of another component of a same component-type having a fault-free coating.

17. The method of claim 16, wherein the examining comprises:
dividing, via the computing device, the at least one recorded image into a plurality of individual sectors, and
examining the individual sectors for a faulty coating with the preservation medium.

18. The method of claim 17, wherein the individual sectors are compared with respective corresponding sectors of the stored image.

* * * * *